Aug. 8, 1961  D. C. MITCHELL ET AL  2,995,462
BEARING MATERIAL
Filed March 4, 1957
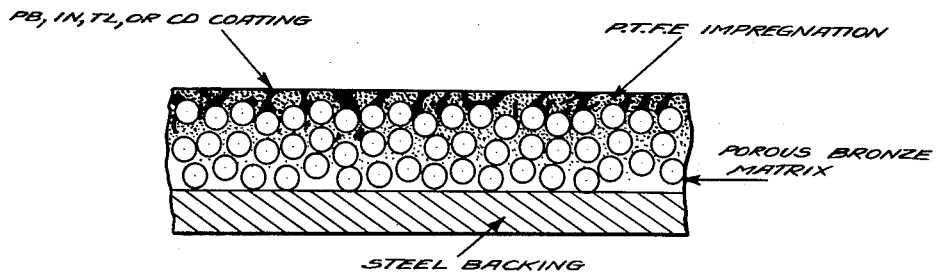
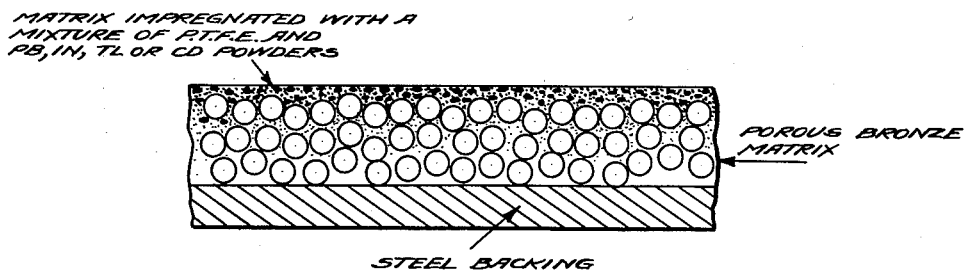
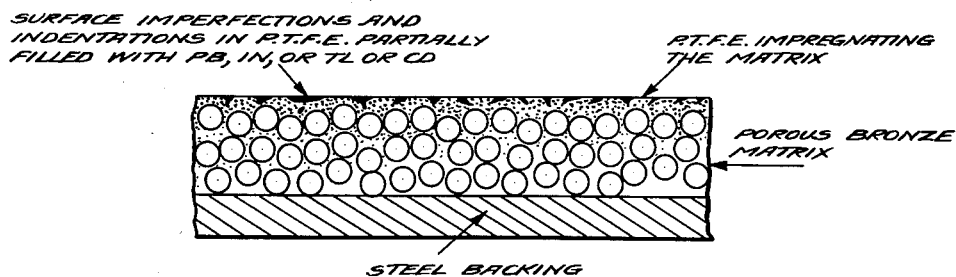

United States Patent Office 2,995,462
Patented Aug. 8, 1961

2,995,462
BEARING MATERIAL
David Conrad Mitchell and Phil Prince Love, Wembley, England, assignors to The Glacier Metal Company Limited, Wembley, England, a company of Great Britain
Filed Mar. 4, 1957, Ser. No. 643,535
Claims priority, application Great Britain, Mar. 7, 1956
9 Claims. (Cl. 117—8)

This invention relates to bearings and bearing materials of the kind which include a porous metal matrix impregnated with polytetrafluoroethylene (hereinafter referred to for convenience as PTFE). The matrix may for example be sintered porous bronze or sintered iron fibres or a metal gauze. This porous metal matrix may or may not be fixed to a rigid nonporous backing.

It has now been discovered that improved bearings of the kind referred to can be obtained by incorporating a proportion of lead, indium, thallium, cadmium or a combination of two or more of such metals into the PTFE surface. Tests show that the life of such bearings can be increased in this way.

Thus according to one aspect of the present invention, in a bearing or bearing material including a porous metal matrix impregnated with PTFE, the bearing surface comprises in part PTFE and the matrix metal and in part a member of the following group of metals: lead, indium, thallium, cadmium and a combination of two or more of such metals (hereinafter referred to as the group of metals).

In the manufacture of bearings comprising a matrix impregnated with PTFE the finished bearing before use normally has a thin layer of PTFE extending across its bearing surface, which layer is partially or wholly worn away to expose areas of the matrix during initial running of the bearing. The term "bearing surface" used herein is therefore to be understood as including constructions of bearing in which there extends over the surface of the matrix such a layer of PTFE of a thickness such that it will be partially or wholly worn away to expose areas of the matrix during the initial running of the bearing.

It is thought that during operation of the bearing its rubbing surface will consist of a mixture of PTFE, the porous metal matrix and the member of the group of metals while the mating surface of the part carried by the bearing will consist of a mixture of the metal of that part, PTFE, and the member of the group of metals.

The reasons for the improvement in the bearing surface are not yet fully understood, but it is thought that it may result from the fact that the lead has a melting point below the transition temperature of the PTFE (327° C.), has a low shear strength and does not readily diffuse or form compounds with the other metals forming the rubbing combination.

Preferably the member of the group of metals will form from .01% to 30% of the PTFE by volume.

The actual proportion of the member of the group of metals will depend to some extent on how it is present. When it is present at the initially exposed surface then less is required than when it is not present on the initially exposed surface and is, for example, mainly present in the region of the surface of the porous metal matrix so as to be exposed, at least mainly, only after initial running.

It is preferred that, at least after an initial period of wear, the member of the group of metals forms from .01% to 30% of the total bearing surface area.

According to another aspect of the invention there is provided a method of manufacturing a bearing or bearing material including a porous metal matrix impregnated with PTFE and of the kind having a residual surface film of PTFE after impregnation, in which the surface film has a multiplicity of recesses and there is applied to the recesses a member of the group of metals.

One convenient method of producing the recesses in the surface film is to use a mechanical process such, for example, as by knurling the surface of the bearings by passage between knurled rolls, by ball indenting the surface, by machining away part of the surface as, for example, by turning a series of grooves in the surface, or by drilling holes in the surface.

An alternative method of producing the recesses is by causing cracks to be formed in the surface film of PTFE by control of the impregnation process. Thus for example the impregnation may be done so as to produce a thick surface layer of PTFE which will crack during curing or the impregnated material may be heated up quickly during curing and the volatile impurities in the PTFE vapourised rapidly thus giving rise to imperfections in the PTFE surface layer.

The member of the group of metals may be applied in several different ways to the recesses in the surface film of PTFE as for example by dipping the impregnated bearing or bearing material into molten metal, by spraying molten metal on to it and removing the excess or by electro-plating the member of the group of metals on to the metal matrix through a discontinuous surface layer of PTFE.

Alternatively a member of the group of metals may be incorporated with the PTFE used for impregnation.

Another convenient method of manufacture is to apply a member of the group of metals to the outer surface of the matrix or to the particles of the matrix before impregnation. Thus for example the surface of the matrix may be electro-plated with a member of the group of metals before impregnation with PTFE.

In the course of a series of tests carried out to show the improvements achieved by the addition of members of the group of metals to PTFE impregnated bearings of the type comprising a porous bronze matrix on a steel backing, tests were made on thrust washers using a load of 60 lbs./sq. in. on the specimen and a rubbing surface speed of 340 ft. per minute. A normal bearing which did not contain a member of the group of metals failed after a period of 220 hours on test. A bearing containing about 10% by volume of lead, but otherwise identical with the first bearing ran for 356 hours before failure took place. A similar bearing containing 30% of cadmium in the surface failed after 722 hours and a bearing containing 15% of indium in the surface failed after 584 hours.

The invention may be performed in various ways but five examples will now be given by way of example.

In a method for preparing a lead-containing bearing, lead plating is applied to the surface of a porous bronze matrix impregnated with PTFE as by rolling in a known manner which results in discontinuities in the PTFE surface layer due to mud cracking. The impregnated surface of the material is then plated for a period of 10 minutes with a current density of 15 amps. per square foot in a bath containing lead fluoborate solution with a concentration of 150 grams lead fluoborate per litre. A deposit is thus obtained which may completely fill all the cracks in the surface and some excess lead remains above the surface, the lead deposit being equivalent to 0.0003″ lead when spread over the whole surface.

In a method in which the lead is contained in the PTFE which is used for impregnation a fine lead powder (−300 BSS mesh) is added to a PTFE slurry and the whole mixed thoroughly. Excess liquid is then removed by centrifuging and the lead/PTFE mixture is roll-impregnated into sintered bronze in the manner known for impregnating PTFE alone.

A method of producing a bearing material in strip form comprises indenting, by rolling, to a depth of 0.002 inch a strip of steel-backed porous bronze impregnated with PTFE. The whole strip is then immersed in a bath of molten lead at a temperature of 380° C. This strip is then removed from the bath and rapidly wiped with an asbestos cloth to remove the surplus lead. The resulting material has some lead in surface imperfections of the PTFE and some of the indentations filled with lead.

In a method for producing a cadmium-containing bearing a PTFE impregnated bronze material is electro-plated using a cadmium cyanide bath for a period of 10 minutes at a current density of 8 amps. per square foot. In a similar method for producing an indium-containing bearing porous sintered iron may be impregnated with indium by electro-plating using a current density of 8 amps. per square foot for a time of 15 minutes. This material is then vacuum impregnated with PTFE.

The invention and more particularly the three products produced by the methods described above are illustrated in the accompanying drawings in which FIG. 1 is a diagrammatic cross-section of a bearing, prior to use, formed by first coating the porous metal matrix e.g. bronze with a metal of the group consisting of Pb, In, Tl and Cd and then impregnating the coated surface with polytetrafluoroethylene (PTFE), FIG. 2 is a diagrammatic cross-section of a bearing prior to use, formed by impregnating the porous metal matrix e.g. bronze with a mixture of polytetrafluoroethylene (PTFE) and a metal of the group consisting of Pb, In, Tl and Cd, and FIG. 3 is a diagrammatic cross-section of a bearing, prior to use, formed by first impregnating the surface of the porous metal matrix e.g. bronze with polytetrafluoroethylene (PTFE) and then introducing a metal of the group consisting of Pb, In, Tl and Cd into surface depressions and cracks in the polytetrafluoroethylene coating.

As appears from the drawings each bearing element illustrated consists of a rigid, non-porous backing which is illustrated as being a steel backing, a porous metal matrix which is illustrated as being a porous bronze matrix, with PTFE and one of the metals Pb, In, Tl and Cd in and upon the surface of the matrix. We are unable to describe or illustrate the precise physical relationship of the PTFE and the added metal to each other and to the matrix as a result of the three methods described but we have assumed that in the method illustrated in FIG. 1 the metal coating is not continuous and consists of metal particles attached to the matrix and that the PTFE coats and impregnates around these metal particles, in the method illustrated in FIG. 2 the mixture of PTFE and added metal coats and impregnates the surface of the matrix and in the method illustrated in FIG. 3 the added metal penetrates into the PTFE coating but is not attached to or in contact with the matrix.

What we claim as our invention and desire to secure by Letters Patent is:

1. A bearing material comprising a porous metal matrix impregnated and coated with polytetrafluoroethylene having incorporated therein a metal of the group consisting of lead, indium, thallium and cadmium in an amount by volume within the range from about 0.01% to about 30% based upon the polytetrafluoroethylene.

2. A bearing material as defined in claim 1 in which the bearing surface after an initial period of wear consists of the matrix metal, polytetrafluoroethylene and said metal of the group consisting of lead, indium, thallium and cadmium.

3. A bearing material as defined in claim 2 in which said metal of said group is lead.

4. A bearing material as defined in claim 2 in which said metal of said group is indium.

5. A bearing material as defined in claim 2 in which said metal of said group is thallium.

6. A bearing material as defined in claim 2 in which said metal of said group is cadmium.

7. A bearing material as defined in claim 1 which, prior to its initial period of use consists of said porous metal matrix, a coating thereon of a metal of said group and a surface layer and impregnation of polytetrafluoroethylene.

8. A bearing material as defined in claim 1 which, prior to its initial period of use consists of said porous metal matrix and a surface layer and impregnation of a mixture of polytetrafluoroethylene and said metal of said group.

9. A bearing material as defined in claim 1 which, prior to its initial period of use consists of said porous metal matrix, a surface layer and impregnation of polytetrafluoroethylene and said metal of said group in finely divided form in surface depressions in said layer of polytetrafluoroethylene.

References Cited in the file of this patent

UNITED STATES PATENTS

| | | |
|---|---|---|
| 2,214,104 | Hildabolt et al. | Sept. 10, 1940 |
| 2,400,091 | Alfthan | May 14, 1946 |
| 2,400,099 | Brubaker et al. | May 14, 1946 |
| 2,691,814 | Tait | Oct. 19, 1954 |
| 2,700,623 | Hall | Jan. 25, 1955 |
| 2,715,617 | White | Aug. 16, 1955 |
| 2,731,360 | Love | Jan. 17, 1956 |
| 2,798,005 | Love | July 2, 1957 |